United States Patent Office 2,880,238
Patented Mar. 31, 1959

2,880,238

3,3-DICHLORO-2-METHYLALLYL OXIME ETHERS

Donald G. Kundiger, Manhattan, Kans., and Clarence Rineheart Dick, Lake Jackson, Tex., assignors to The Dow Chemical Company, Midland, Mich., a corporation of Delaware No Drawing. Application April 23, 1958
Serial No. 730,275

7 Claims. (Cl. 260—566)

This invention relates to oxime ethers and in particular to novel oxime ethers corresponding to the formula

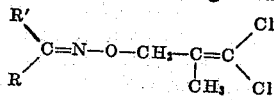

In this and succeeding formulas, R and R' when taken together represent a pentamethylene radical, or, taken separately R represents lower alkyl, and R' represents hydrogen, lower alkyl or phenyl. In the present specification and claims, the term lower alkyl refers to an alkyl radical containing from one to four carbon atoms, inclusive. The new oxime compounds are liquids or solids soluble in many common organic solvents such as ethanol or xylene, and of very low solubility in water. They are useful as parasiticides and adapted to be employed as the active toxicants in compositions for the control of insects and mites.

The new 3,3-dichloro-2-methylallyl oxime ethers may be prepared by causing 1,1,3-trichloro-2-methyl-1-propene to react with an alkali metal oxime salt having the formula

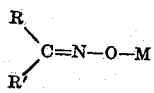

wherein M represents an alkali metal. Good results are obtained when the oxime salt and the propene reactant are employed in substantially equimolecular proportions. The reaction is carried out in a liquid reaction medium and takes place smoothly at the temperature range of 20° to 100° C. with the formation of the desired product and alkali metal chloride of reaction.

In carrying out the reaction, the propene reactant and the alkali metal oxime salt are intimately mixed and stirred together in an inert liquid reaction medium such as acetone, a lower alkanol, water, dioxane, dimethyl formamide, or tetrahydrofuran and the resulting mixture maintained for a period of time at the contacting temperature range. When water is employed as a reaction medium, the alkali metal chloride of reaction will be found dissolved or slurried therein, and may be separated by washing and decantation. When an organic liquid is employed as a reaction medium, the alkali metal salt usually precipitates during the course of the reaction or upon cooling and may be separated by filtration. Following the separation of the alkali metal chloride, the residue may be dried and thereafter fractionally distilled under reduced pressure, to separate the desired product. This product may be further purified, if desired, by adsorption of impurities in a chromatographic column such as a magnesium oxide-Supercel (diatomaceous earth) column using petroleum ether as eluent.

In an alternative and preferred operation, the alkali metal oxime salt is prepared in situ, during the course of the reaction. In such method, the oxime is dispersed in the reaction medium with the alkaline agent, and the 1,1,3-trichloro-2-methyl-1-propene thereafter added thereto. The addition is carried out portionwise with stirring and at a temperature of from 20° to 100° C. The alkaline agent to be employed may be a carbonate, lower alkoxide, or hydroxide of an alkali metal. When an alkali metal lower alkoxide is employed as alkaline agent, the reaction conveniently is carried out in the alkanol from which the alkoxide is prepared. Good results are obtained when the oxime, the propene reactant, and the alkaline agent are employed in substantially stoichiometric proportions. When the alkaline agent is an alkali metal alkoxide, alkali metal acid carbonate, or alkali metal hydroxide, good results are obtained when substantially equimolecular proportions of oxime, propene reactant, and alkaline agent are employed. Upon completion of the reaction, the reaction mixture may be processed as previously described to obtain the desired product.

The following examples illustrate the invention but are not to be construed as limiting it.

*Example 1.—O-(3,3-dichloro-2-methylallyl) acetone oxime*

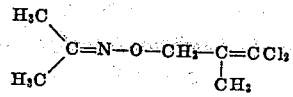

1,1,3-trichloro-2-methyl-1-propene (159.5 grams; 1.0 mole) was added dropwise with stirring over a period of one hour to a mixture of 73 grams (1.0 mole) of acetone oxime and 138 grams (1.0 mole) of potassium carbonate dispersed in 500 milliliters of acetone which was boiling and under reflux. Stirring was thereafter continued as the mixture was boiled under reflux for 10.5 hours, to complete the reaction. The reaction mixture was then cooled to room temperature, whereupon by-product salts precipitated and were removed by filtration. The filtrate was evaporated to a volume of about 100 milliliters and diluted with diethyl ether. The ether solution was washed twice with 10 percent aqueous sodium hydroxide, dried over anhydrous magnesium sulfate, and the ether solvent then removed by vaporization, to recover an oily residue. The latter was fractionally distilled under reduced pressure to obtain an O-(3,3-dichloro-2-methylallyl) acetone oxime product boiling in the temperature range of 101°–104° C. at 28 milliliters' pressure. The distillate was dissolved in petroleum ether (boiling in the range of 35°–60° C.), purified by adsorption of impurities in a chromatographic column comprising 1:2 magnesium oxide-Supercel (diatomaceous earth). The product was recovered from the column by elution with the petroleum ether. The eluate was warmed to vaporize the solvent and yield a purified O-(3,3-dichloro-2-methylallyl) acetone oxime product as a liquid material having carbon, hydrogen, and nitrogen contents of 43.13, 6.89, and 5.72 percent respectively, compared with theoretical values of 42.8, 7.12, and 5.62 percent, respectively.

*Example 2.—O-(3,3-dichloro-2-methylallyl) acetone oxime*

1,1,3-trichloro-2-methyl-1-propene (80 grams, 0.5 mole) was added dropwise with stirring over a period of one half hour to a boiling mixture of 36.5 grams (0.5 mole) of acetone oxime and 27.0 grams of sodium methoxide in 400 milliliters of absolute methanol, under reflux. Upon completion of the addition, stirring and boiling under reflux were continued for 15.5 hours to complete the reaction. During the reaction by-product sodium chloride precipitated, and was thereafter removed by filtration. The filtrate was distilled to remove the methanol solvent, and the residual liquid cooled, whereupon crystals of the reactant acetone oxime precipitated therein and were removed by filtration. The filtrate was then purified by fractional distillation and separation on a chromatographic column as in Example 1. The eluate from the column was evaporated to yield an O-(3,3-dichloro-2-methylallyl) acetone oxime product as a liquid residue having a refractive index (n/D) of 1.4840 at 20° C.

*Example 3.—O-(3,3-dichloro-2-methylallyl) acetone oxime*

1,1,3-trichloro-2-methyl-1-propene (80 grams, 0.5 mole) was added dropwise with stirring over a period of one hour to a mixture of 36.5 grams (0.5 mole) of acetone oxime, 40.0 grams (1 mole) of sodium hydroxide, 200 milliliters of methanol, and 75 milliliters of water under reflux. During the addition, the temperature of the reaction mixture rose from room temperature to 44° C. Stirring was thereafter continued and the reaction mixture maintained at 45° C. and under reflux for an additional 16 hours. The reaction mixture was then cooled, whereupon it separated into two immiscible layers. The organic layer was removed, dried, and fractionally distilled to obtain an O-(3,3-dichloro-2-methylallyl) acetone oxime product boiling at from 47°–53° C. at 0.5–0.7 millimeter pressure, and having an index of refraction (n/D) of 1.4835 at 20° C.

*Example 4.—O-(3,3-dichloro-2-methylallyl) 2-butanone oxime*

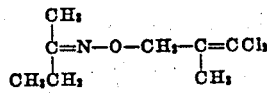

In a manner similar to that described in the first example, 1,1,3-trichloro-2-methyl-1-propene (159.5 grams, 1 mole) was added dropwise with stirring during a period of 24 hours to a boiling anhydrous mixture of 87 grams (1.0 mole) of 2-butanone oxime, 276 grams (2 moles) of potassium carbonate, and 500 milliliters of acetone, under reflux. Following the addition, the mixture was boiled under reflux for 12 hours, cooled, potassium chloride byproduct precipitate removed by filtration, and excess solvent removed by vaporization. The reaction mixture was thereafter distilled to obtain an O-(3,3-dichloro-2-methylallyl) 2-butanone oxime product boiling at 55° C. at 28 millimeters' pressure. This product was further purified by separation on a chromatographic column as previously described. The purified product had an index of refraction, (n/D) of 1.4819 at 20° C. and contents of carbon of 45.85, hydrogen of 6.12, and nitrogen of 6.45 percent by analysis, as compared to theoretical contents of 45.71, 6.23, and 6.66 percent, respectively.

*Example 5.—O-(3,3-dichloro-2-methylallyl) acetophenone oxime*

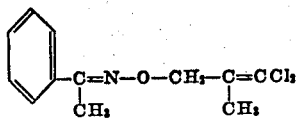

In a manner similar to that described in Example 1, 1,1,3-trichloro-2-methyl-1-propene (80 grams; approximately 0.5 mole) was added dropwise with stirring over a period of 24 hours to an anhydrous, boiling mixture of 67.5 grams (0.5 mole) of acetophenone oxime and 138 grams (1 mole) of potassium carbonate dispersed in 500 milliliters of acetone under reflux. Following the addition, boiling and stirring were continued under reflux for 12 hours to complete the reaction. Thereafter the reaction mixture was filtered to remove precipitated salt by-products and the filtrate further purified as in Example 1 to obtain an O-(3,3-dichloro-2-methylallyl) acetophenone oxime product as a liquid having a boiling point of 138.5°–140° C. at 0.22–0.29 millimeter pressure and a refractive index (n/D) of 1.5578 at 20° C. The product had contents of carbon of 55.64, and hydrogen 4.87 percent as compared with theoretical contents of 55.8 and 5.04 percent, respectively.

*Example 6.—O-(3,3-dichloro-2-methylallyl) cyclohexanone oxime*

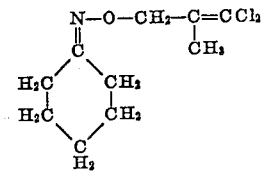

1,1,3-trichloro-2-methyl-1-propene (80 grams; 0.5 mole) was added dropwise with stirring over a period of 36 hours to a boiling mixture of 56.5 grams (0.5 mole) of cyclohexanone oxime and 138.0 grams (1.0 mole) of potassium carbonate in 500 milliliters of acetone, under reflux. Following the addition, stirring and boiling were continued for 12 hours to complete the reaction. Thereafter the mixture was filtered to remove the precipitated salt by-products and filtrate was purified as described in Example 1, to obtain an O-(3,3-dichloro-2-methylallyl) cyclohexanone oxime product as a liquid having a boiling point of 99.5°–100° C. at 0.9 millimeter pressure and a refractive index (n/D) of 1.5111 at 20° C. The product had contents of carbon of 50.3 percent of hydrogen of 6.12 percent, and of nitrogen of 5.75 percent, as compared with theoretical values of 50.8, 6.34, and 5.93 percent respectively.

*Example 7.—O-(3,3-dichloro-2-methylallyl) cyclohexanone oxime*

1,1,3-trichloro-2-methyl-1-propene (100 grams; 0.63 mole) was added with stirring to a solution of 56.5 grams (0.5 mole) of cyclohexanone oxime and 41.5 grams (0.63 mole) of potassium hydroxide in 500 milliliters of water. The mixture was vigorously stirred and heated at 70° C. for 24 hours to complete the reaction. The mixture was then allowed to cool, whereupon it separated into an aqueous and an organic layer. The aqueous layer was extracted with chloroform and the chloroform extract combined with an organic layer. The combined organic phase was dried and fractionally distilled and the distillate purified on a chromatographic column as previously described to obtain an O-(3,3-dichloro-2-methylallyl) cyclohexanone oxime product having an index of refraction (n/D) of 1.5118 at 20° C.

*Example 8.—O-(3,3-dichloro-2-methylallyl) benzophenone oxime*

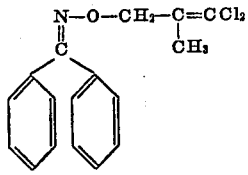

The sodium salt of benzophenone oxime used as a starting material in this preparation was produced by adding benzophenone oxime to an equimolecular portion of sodium ethoxide in absolute ethanol, and heating the mixture at 50° C. Ethanol solvent was thereafter removed from the mixture by evaporation and the product residue washed with diethyl ether, to separate and purify the resulting sodium salt of benzophenone oxime.

1,1,3-trichloro-2-methyl-1-propene (80 grams, 0.5 mole) was added to 97 grams (0.463 mole) of the sodium salt of benzophenone oxime dispersed in 500 milliliters of anhydrous tetrahydrofuran. The resulting reaction mixture was heated for 2.5 hours at 56° C. and thereafter for 24 hours at 70° C. to complete the reaction, and then cooled. To separate the desired product, the cooled reaction mixture was filtered, the filtrate washed with 10 percent aqueous sodium hydroxide, dried, heated at atmospheric pressure to distill the solvent and to recover a liquid residue. The residue resulting from these steps was then fractionally distilled to obtain an O-(3,3-dichloro-2-methyallyl) benzophenone oxime product boiling from 168° to 171° C. at 0.35 millimeter pressure. The product on cooling crystallized as a white solid melting from 65.5° to 67.5° C.

*Example 9.—O-(3,3-dichloro-2-methylallyl) beta-benzaldoxime*

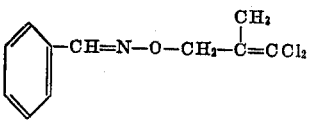

1,1,3-trichloro-2-methyl-1-propene (80 grams; 0.5 mole) was added to 57.6 grams (0.444 mole) of β-benzaldoxime (having a melting point of 32° C.) and 12.5 grams (0.50 mole) of sodium dissolved in 200 milliliters of absolute methanol at 0° C. Thereafter the mixture was heated and its temperature was maintained at 26° C. for 30 hours to complete the reaction. To separate the desired product, the mixture was filtered, and the filtrate washed with water, the organic layer removed, dried, and the dried residue distilled under reduced pressure. As a result of these operations there was obtained an O-(3,3-dichloro-2-methylallyl) β-benzaldoxime product boiling at 111° C. under 0.30 millimeter pressure. This product had a refractive index (n/D) of 1.5695.

*Example 10.—O-(3,3-dichloro-2-methylallyl) propionaldoxime*

1,1,3-trichloro-2-methyl-1-propene (169.5 grams; 1.0 mole) is added dropwise with stirring over a period of one hour to a boiling mixture of 73.1 grams (1.0 mole) of propionaldoxime and 138 grams (1.0 mole) of potassium carbonate dispersed in 500 milliliters of acetone under reflux. Stirring is thereafter continued as the mixture is boiled under reflux for 12 hours, to complete the reaction. The reaction mixture is then cooled to room temperature, whereupon byproduct potassium chloride precipitates and is removed by filtration. The filtrate is evaporated to a volume of about 100 milliliters. This is diluted with diethyl ether, washed with 10 percent aqueous sodium hydroxide, and thereafter dried over anhydrous magnesium sulfate, and the ether solvent then removed by vaporization. The residue is fractionally distilled under reduced pressure to obtain an O-(3,3-dichloro-2-methyl-allyl) propionaldoxime product. O-(3,3-dichloro-2-methylallyl)propionaldoxime has a molecular weight of 196.08.

In similar manner, O-(3,3-dichloro-2-methylallyl) acetaldoxime is prepared by reacting together 1,1,3-trichloro-2-methyl-1-propene, potassium carbonate, and acetaldoxime.

O-(3,3-dichloro-2-methylallyl) di-isobutyl-ketone oxime is prepared by reacting together 1,1,3-trichloro-2-methyl-1-propene, potassium bicarbonate, and symmetrical di-isobutyl-ketone oxime.

The new 3,3-dichloro-2-methylallyl oxime ethers of the present invention are useful as parasiticides, and are adapted to be employed as the toxic constituents in compositions for the control of insects, nematodes, fungi, and bacteria. For such use the products may be dispersed on inert finely divided solids and employed as dusts. Also, such mixtures may be dispersed in water with the aid of a wetting agent, and the resulting aqueous suspensions used as sprays. In other operations, the compounds may be employed in oil, or other liquid solvent and the resulting composition employed directly, or as a component of oil-in-water or water-in-oil emulsions, to obtain a preparation to be used as a spray or wash. In a representative operation, the inclusion in standard nutrient agar medium of one percent by weight of O-(3,3-dichloro-2-methylallyl) acetone oxime completely controlled the growth of *Staphylococcus aureus* when said medium was inoculated with a culture thereof.

We claim:

1. A 3,3-dichloro-2-methylallyl oxime ether corresponding to the formula

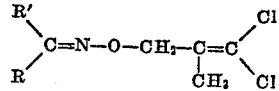

wherein R and R' when taken together represent a pentamethyene radical, and when taken individually R represents a member of the group consisting of lower alkyl and phenyl, and R' represents a member of the group consisting of hydrogen lower alkyl and phenyl.

2. O-(3,3-dichloro-2-methylallyl) acetone oxime.
3. O-(3,3-dichloro-2-methylallyl) 2-butanone oxime.
4. O-(3,3-dichloro-2-methylallyl) acetophenone oxime.
5. O-(3,3-dichloro-2-methylallyl) cyclohexanone oxime.
6. O-(3,3-dichloro-2-methylallyl) β-benzaldoxime.
7. A method of preparing an O-(3,3-dichloro-2-methylallyl)oxime corresponding to the formula

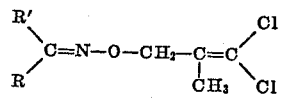

wherein R and R' when taken together represent a pentamethylene radical and when taken individually R represents a member of the group consisting of lower alkyl and phenyl, and R' represents a member of the group consisting of hydrogen, lower alkyl and phenyl which comprises causing 1,1,3-trichloro-2-methyl-1-propene to react with an alkali metal oxime salt corresponding to the formula

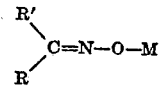

wherein R and R' are as above defined and M is an alkali metal.

References Cited in the file of this patent
UNITED STATES PATENTS

| 2,712,031 | Huffman | June 23, 1955 |
| 2,765,339 | Huffman | Oct. 2, 1956 |
| 2,770,652 | England | Nov. 13, 1956 |

OTHER REFERENCES

McElvain et al.: J.A.C.S., vol. 69, p. 2669 (1947).